ORVILLE M. PHILLIPS, OF NEW YORK, N. Y.

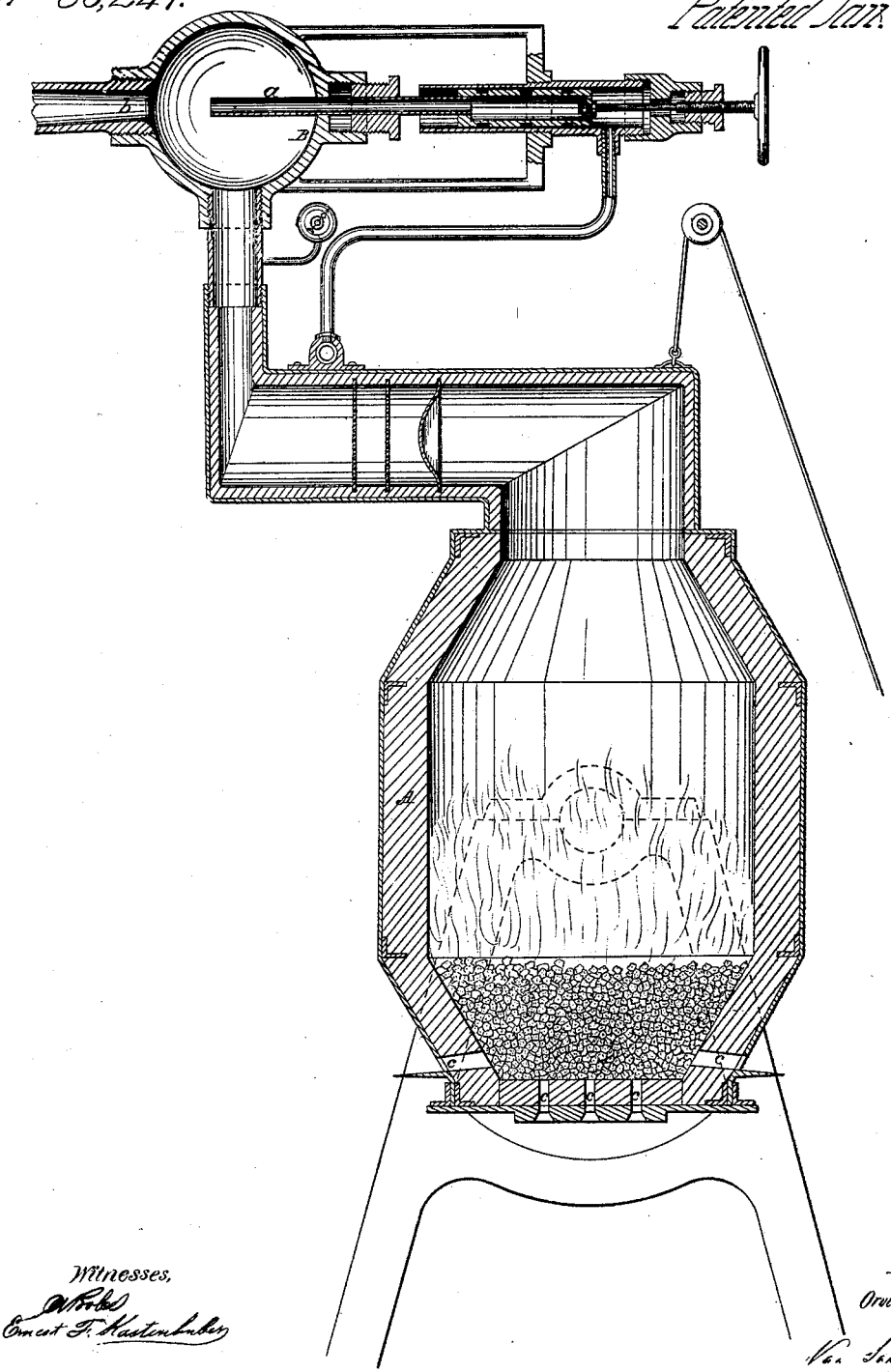

Letters Patent No. 86,247, dated January 26, 1869.

IMPROVEMENT IN INTRODUCING OXYGEN-GAS INTO FURNACES, RETORTS, CONVERTERS, &c.

The Schedule referred to in these Letters Patent and making part of the same.

*To all whom it may concern:*

Be it known that I, ORVILLE M. PHILLIPS, of the city, county, and State of New York, have invented a new and useful Improvement in Introducing Oxygen-Gas into Furnaces, Retorts, Converters, and so forth, by suction; and I do hereby declare the following to be a full, clear, and exact description thereof, which will enable those skilled in the art to make and use the same.

This invention is based on the well-known fact that pure oxygen-gas, when injected into a furnace, retort, or other apparatus of a similar nature, or when brought in contact with combustible substances of any kind, at the required temperature, will produce a much more rapid and perfect combustion, and a much more intense heat, than ordinary atmospheric air under like circumstances.

My present invention consists in introducing the pure oxygen-gas into a furnace, retort, pot, converter, or other apparatus of a similar nature, by suction, instead of by force, in such a manner that the oxygen-gas is caused to permeate the contents of said furnace, retort, pot, or converter, and to come in intimate contact with every particle thereof, and at the same time the products of combustion are rapidly expelled, and the effect of the oxygen-gas is materially improved.

In order to fully explain my invention, I will refer to the annexed sketch of an apparatus, such as I can use in carrying out my invention.

In this sketch, the letter A represents a converter, which is hung on trunnions, and otherwise constructed in the ordinary manner.

To the mouth of this converter is attached a suction-apparatus, B, of any desirable construction, by preference, such as shown in the drawing, where the suction is produced by a current of steam injected through the nozzle, *a*, and escaping through the conical spout, *b*.

In the bottom of the converter is a series of holes, *c*, which are intended to connect, by a pipe or any other means, with a reservoir or gas-holder, containing the oxygen.

After the converter has been charged with the molten metal, I start the suction-apparatus, and then I open the communication between the gas-holder and the holes in the bottom of the converter, and, by the suction, the oxygen-gas is caused to pass up through the molten metal, consuming the impurities contained therein, and producing a very intense heat, whereby the operation of refining iron, or converting such iron into steel, is materially facilitated.

My invention is also applicable, with great advantage, to glass-furnaces, or furnaces used for any other purpose where an intense heat is required, and it can be used with particular advantage in the process of roasting, desulphurizing, or smelting ores, as described in Letters Patent granted to John Absterdam, January 22, 1866, and reissued to me as President of the First National Ore-Smelting and Desulphurizing Company, January 12, 1869.

By using, in this process, pure oxygen-gas, in place of the atmospheric air heretofore used, I am enabled to roast and desulphurize the ore much more rapidly, and with greater perfection than before, and, by the very intense heat produced by my process, the operation of smelting the ore is materially facilitated.

I do not claim as my invention the introduction of air or hydrocarbons into a furnace, retort, converter, or pot, by suction, since this process has been fully described in the various patents granted to John Absterdam, January 23, 1866, and November 24, 1868, and I distinctly disclaim everything shown and described in these patents; but

What I claim as new, and desire to secure by Letters Patent, is—

The within-described process of introducing pure oxygen-gas into a furnace, retort, converter, or pot, by suction, substantially in the manner set forth.

ORVILLE M. PHILLIPS.

Witnesses:
W. HAUFF,
ERNEST F. KASTENHUBER.